(12) United States Patent
Baek et al.

(10) Patent No.: US 12,297,331 B2
(45) Date of Patent: May 13, 2025

(54) HARD COATING FILM

(71) Applicant: LG CHEM, LTD., Seoul (KR)

(72) Inventors: Seungil Baek, Daejeon (KR); Eun Seon Lee, Daejeon (KR); Ha Neul Kim, Daejeon (KR); Woo Han Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 1074 days.

(21) Appl. No.: 17/041,121

(22) PCT Filed: Apr. 29, 2019

(86) PCT No.: PCT/KR2019/005153
§ 371 (c)(1),
(2) Date: Sep. 24, 2020

(87) PCT Pub. No.: WO2019/212215
PCT Pub. Date: Nov. 7, 2019

(65) Prior Publication Data
US 2021/0115210 A1 Apr. 22, 2021

(30) Foreign Application Priority Data

May 3, 2018 (KR) .................. 10-2018-0051357
Apr. 26, 2019 (KR) .................. 10-2019-0049058

(51) Int. Cl.
C08J 7/04 (2020.01)
C08J 5/18 (2006.01)
C08J 7/046 (2020.01)
C08J 7/16 (2006.01)

(52) U.S. Cl.
CPC ............... C08J 7/046 (2020.01); C08J 5/18 (2013.01); C08J 7/042 (2013.01); C08J 7/16 (2013.01); C08J 2367/04 (2013.01); C08J 2369/00 (2013.01); C08J 2383/06 (2013.01); C08J 2383/07 (2013.01)

(58) Field of Classification Search
CPC ............. C08J 2367/02; C08J 2367/04; C08J 2369/00; C08J 2383/06; C08J 2383/07; C08J 2463/00; C08J 2483/04; C08J 2483/06; C08J 5/18; C08J 7/042; C08J 7/046; C08J 7/16
See application file for complete search history.

(56) References Cited

U.S. PATENT DOCUMENTS

| 7,399,813 | B2 | 7/2008 | Lang et al. |
| 7,977,530 | B2 | 7/2011 | Dodge, II et al. |
| 7,977,531 | B2 | 7/2011 | Dodge, II et al. |
| 8,198,385 | B2 | 6/2012 | Gartner et al. |
| 8,252,873 | B1 | 8/2012 | Gartner et al. |
| 9,737,874 | B2 | 8/2017 | Wattebled et al. |
| 2013/0331476 | A1 | 12/2013 | Bae et al. |
| 2015/0159044 | A1* | 6/2015 | Bae ............ C08G 59/3281 523/435 |
| 2015/0166827 | A1* | 6/2015 | Chen ............ C08G 18/809 428/447 |
| 2016/0046830 | A1 | 2/2016 | Kim et al. |
| 2016/0297933 | A1 | 10/2016 | Kuwana et al. |
| 2017/0179424 | A1* | 6/2017 | Lee ............ H10K 59/87 |
| 2018/0142128 | A1 | 5/2018 | Kikuchi |
| 2018/0237658 | A1 | 8/2018 | Yoon et al. |
| 2018/0282485 | A1 | 10/2018 | Kuwana et al. |
| 2018/0346759 | A1 | 12/2018 | Kikuchi |

FOREIGN PATENT DOCUMENTS

| CN | 105764948 A | 7/2016 |
| CN | 106010022 A | 10/2016 |
| CN | 107921476 A | 4/2018 |
| JP | 2000-052472 A | 2/2000 |
| JP | 2011-001421 A | 1/2011 |
| JP | 2012-066477 A | 4/2012 |
| JP | 5441056 B2 | 3/2014 |
| JP | 2015-524855 A | 8/2015 |
| JP | 2015-193747 A | 11/2015 |
| JP | 2016-094500 A | 5/2016 |
| JP | 2017-008142 A | 1/2017 |
| KR | 10-1433681 B1 | 8/2014 |
| KR | 10-2015-0068240 A | 6/2015 |
| KR | 10-2015-0088219 A | 7/2015 |
| KR | 10-1601990 B1 | 3/2016 |
| KR | 10-1635257 B1 | 6/2016 |
| KR | 10-2016-0115612 A | 10/2016 |
| KR | 10-2017-0000065 A | 1/2017 |
| KR | 10-2017-0073948 A | 6/2017 |
| KR | 10-1789350 B1 | 10/2017 |
| KR | 10-1820257 B1 | 1/2018 |
| KR | 10-2018-0019115 A1 | 2/2018 |
| WO | 2017-034357 A1 | 3/2017 |
| WO | 2017-141906 A1 | 8/2017 |

OTHER PUBLICATIONS

International Search Report issued for International Application No. PCT/KR2019/005153 on Aug. 7, 2019, 4 pages.

* cited by examiner

Primary Examiner — Maria V Ewald
Assistant Examiner — Daniel P Dillon
(74) Attorney, Agent, or Firm — ROTHWELL, FIGG, ERNST & MANBECK, P.C.

(57) ABSTRACT

Provided is a hard coating film exhibiting improved flexibility and curling properties together with excellent hardness property, the hard coating film including a top coating layer and a bottom coating layer each disposed on the top surface and the bottom surface of a support substrate layer, wherein the top coating layer includes a cured product of a first resin composition containing epoxy polysiloxane of the following Chemical Formula 1, and the bottom coating layer includes a cured product of a second resin composition containing epoxy polysiloxane of the following Chemical Formula 1 and an elastomer at a weight ratio of 95:5 to 60:40:

$$(R^1SiO_{3/2})_a(R^2SiO_{3/2})_b(OR)_c \quad \text{[Chemical Formula 1]}$$

wherein in Chemical Formula 1, $R^1$, $R^2$, R, a, b, and c are the same as defined in the specification.

17 Claims, No Drawings

HARD COATING FILM

CROSS-REFERENCE TO RELATED APPLICATION

The application is a 35 U.S.C. 371 National Phase Entry Application from PCT/KR2019/005153 filed on Apr. 29, 2019, designating the United States, which claims priority from Korean Patent Application No. 10-2018-0051357 filed on May 3, 2018 and Korean Patent Application No. 10-2019-0049058 filed on Apr. 26, 2019, the disclosures of which are hereby incorporated by reference herein in their entirety.

BACKGROUND OF THE INVENTION

The present invention relates to a hard coating film exhibiting improved flexibility and curling properties together with excellent hardness property.

Recently, with the development of mobile devices such as smartphones and tablet PCs, thinning and slimming of substrates for display are required. Glass or tempered glass is commonly used as a material having excellent mechanical properties on windows or front boards for displays of mobile devices. However, glass and tempered glass cause weight increase of the mobile devices due to their own weight, and have a problem of being easily broken by an external impact and a limitation in applying them to flexible or foldable display devices due to low flexibility.

Therefore, plastic resins are being studied as a substitute for glass. The plastic resins are lightweight but has a lower risk of cracking, and exhibits flexibility which make them more suitable for lightness and flexibility of mobile devices. Representatively, polyethyleneterephtalate (PET), polyethersulfone (PES), polyethylenenaphthalate (PEN), polyacrylate (PAR), polycarbonate (PC), and polyimide (PI) are used, but substrates made of these plastic resins have problems of poor hardness and scratch resistance, as compared with substrates made of glass materials. Therefore, methods of securing high hardness and abrasion resistance by coating a plastic resin substrate with a resin composition to form a hard coating layer have been attempted.

For example, UV curable acrylate-based resins are mainly used for hard coating of foldable display substrates. However, the acrylate-based resins have high curing shrinkage, which causes serious curling. Therefore, a double-sided coating or a thin coating is required.

Further, when single-sided coating is performed for hard coating of foldable display substrates, a curling phenomenon occurs under heat and humidity resistance conditions due to a thermal strain difference from the support substrate. Thus, a method of forming a hard coating layer on both sides of the substrate has been proposed, but there is a problem in that it is not flexible enough to be applied to flexible displays.

Accordingly, it is necessary to develop a composition for forming a hard coating layer and a hard coating film capable of exhibiting improved flexibility and curling properties while maintaining excellent hardness property.

BRIEF SUMMARY OF THE INVENTION

The present invention provides a hard coating film exhibiting improved flexibility and curling properties together with excellent hardness property.

According to one embodiment of the present invention, provided is a hard coating film including:
a support substrate layer;
a top coating layer disposed on the top surface of the support substrate layer; and
a bottom coating layer disposed on the bottom surface of the support substrate layer,
wherein the top coating layer includes a cured product of a first resin composition containing epoxy polysiloxane of the following Chemical Formula 1, and
the bottom coating layer includes a cured product of a second resin composition containing epoxy polysiloxane of the following Chemical Formula 1 and an elastomer at a weight ratio of 95:5 to 60:40:

[Chemical Formula 1]

in Chemical Formula 1, $R^1$ is a functional group represented by the following Chemical Formula 2,

[Chemical Formula 2]

in Chemical Formula 2, $R_a$ is selected from the group consisting of a substituted or unsubstituted alkylene group having 1 to 6 carbon atoms, a substituted or unsubstituted alkenylene group having 2 to 20 carbon atoms, a substituted or unsubstituted alkynylene group having 2 to 20 carbon atoms, —$R_b$—CH=CH—COO—$R_c$—, —$R_d$—OCO—CH=CH—$R_e$—, —$R_f$OR$_g$—, —$R_h$COOR$_i$—, and —$R_j$OCOR$_k$—, $R_b$ to $R_k$ are each independently a single bond or a substituted or unsubstituted alkylene group having 1 to 6 carbon atoms, $R^2$ is selected from the group consisting of a substituted or unsubstituted alkyl group having 1 to 20 carbon atoms, a substituted or unsubstituted cycloalkyl group having 3 to 20 carbon atoms, a substituted or unsubstituted alkenyl group having 2 to 20 carbon atoms, a substituted or unsubstituted alkynyl group having 2 to 20 carbon atoms, a substituted or unsubstituted aryl group having 6 to 20 carbon atoms, a substituted or unsubstituted arylalkyl group having 7 to 20 carbon atoms, a substituted or unsubstituted alkylaryl group having 7 to 20 carbon atoms, an epoxy group, an oxetanyl group, an acrylate group, a methacrylate group, and a hydrogen atom, R is a hydrogen atom or an alkyl group having 1 to 20 carbon atoms, and $0<a\leq 1$, $0\leq b<1$ and $0\leq c<1$, and a+b+c=1.

According to another embodiment of the present invention, provided is a display device including the hard coating film.

DETAILED DESCRIPTION OF THE INVENTION

Hereinafter, a hard coating film according to specific embodiments of the present invention, a method of manufacturing the same, and application thereof will be described in more detail.

However, these are for illustrative purposes only, and the scope of the present invention is not intended to be limited thereby, and it will be apparent to those skilled in the art that various modifications may be made in embodiments without departing from the scope of the present invention.

Unless otherwise mentioned, the terminology used herein is for the purpose of describing particular embodiments only and is not intended to be limiting of the invention.

As used herein, the singular forms are intended to include plural forms as well, unless the context clearly indicates otherwise.

It will be further understood that the term "including", as used herein, specifies stated features, regions, integers, steps, operations, elements, and/or components, but does not preclude the presence or addition of other features, regions, integers, steps, operations, elements, components, and/or groups.

In this specification, "—" described in Chemical Formula and functional groups means a bond or a "binding group".

In this specification, a weight average molecular weight (Mw) and a number average molecular weight (Mn) mean a molecular weight (unit: Da (Dalton)) in terms of polystyrene, as measured by gel permeation chromatography (GPC). In the process of measuring the weight average molecular weight in terms of polystyrene by GPC, analyzers, detectors such as a refractive index detector, and analytical columns commonly known may be used, and temperature conditions, solvents, and flow rates commonly applied may also be applied. Specific examples of the measurement conditions may include a temperature of 30° C., a chloroform solvent, and a flow rate of 1 mL/min.

A hard coating film according to one embodiment of the present invention may include:
a support substrate layer;
a top coating layer disposed on the top surface of the support substrate layer; and
a bottom coating layer disposed on the bottom surface of the support substrate layer,
wherein the top coating layer includes a cured product of a first resin composition containing epoxy polysiloxane of the following Chemical Formula 1, and
the bottom coating layer includes a cured product of a second resin composition containing epoxy polysiloxane of the following Chemical Formula 1 and an elastomer at a weight ratio of 95:5 to 60:40:

[Chemical Formula 1]

in Chemical Formula 1, $R^1$ is a functional group represented by the following Chemical Formula 2,

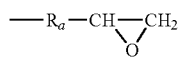
[Chemical Formula 2]

in Chemical Formula 2, $R_a$ is selected from the group consisting of a substituted or unsubstituted alkylene group having 1 to 6 carbon atoms, a substituted or unsubstituted alkenylene group having 2 to 20 carbon atoms, a substituted or unsubstituted alkynylene group having 2 to 20 carbon atoms, —$R_b$—CH=CH—COO—$R_c$—, —$R_d$—OCO—CH=CH—$R_e$—, —$R_f$OR$_g$—, —$R_h$COOR$_i$—, and —$R_j$OCOR$_k$—, $R_b$ to $R_k$ are each independently a single bond or a substituted or unsubstituted alkylene group having 1 to 6 carbon atoms, $R^2$ is selected from the group consisting of a substituted or unsubstituted alkyl group having 1 to 20 carbon atoms, a substituted or unsubstituted cycloalkyl group having 3 to 20 carbon atoms, a substituted or unsubstituted alkenyl group having 2 to 20 carbon atoms, a substituted or unsubstituted alkynyl group having 2 to 20 carbon atoms, a substituted or unsubstituted aryl group having 6 to 20 carbon atoms, a substituted or unsubstituted arylalkyl group having 7 to 20 carbon atoms, a substituted or unsubstituted alkylaryl group having 7 to 20 carbon atoms, an epoxy group, an oxetanyl group, an acrylate group, a methacrylate group, and a hydrogen atom, R is a hydrogen atom or an alkyl group having 1 to 20 carbon atoms, and $0<a\leq1$, $0\leq b<1$ and $0\leq c<1$, and $a+b+c=1$.

Specifically, the hard coating film according to one embodiment of the present invention may include hard coating layers exhibiting excellent hardness property, each hard coating layer including epoxy polysiloxane and being disposed as the top coating layer and the bottom coating layer on the top surface and the bottom surface of the support substrate layer, wherein the bottom coating layer in contact with a substrate to which the hard coating film is applied further includes the elastomer capable of minimizing shrinkage during curing of the epoxy polysiloxane at the optimal weight ratio, thereby greatly improving a curling property and a bending property while exhibiting excellent surface hardness property.

More specifically, in the hard coating film, the top coating layer may include the cured product of the first resin composition containing epoxy polysiloxane of Chemical Formula 1, and the bottom coating layer may include the cured product of the second resin composition containing epoxy polysiloxane of Chemical Formula 1 and the elastomer at a weight ratio of 95:5 to 60:40. In this regard, the cured product may be a photo-cured product or a thermal cured product.

In the top coating layer and the bottom coating layer, the epoxy polysiloxane represented by Chemical Formula 1 may include a silsesquioxane unit of $(R^1SiO_{3/2})$ as a T3 unit.

In the silsesquioxane unit of $(R^1SiO_{3/2})$, $R^1$ is a functional group represented by Chemical Formula 2, and in Chemical Formula 2, $R_a$ may be specifically selected from the group consisting of a substituted or unsubstituted alkylene group having 1 to 6 carbon atoms, a substituted or unsubstituted alkenylene group having 2 to 20 carbon atoms, a substituted or unsubstituted alkynylene group having —$R_b$—CH=CH—COO—$R_c$—, —$R_d$—OCO—CH=CH—$R_e$—, —$R_f$OR$_g$—, —$R_h$COOR$_i$—, and —$R_j$OCOR$_k$—, and more specifically methylene, ethylene, propylene, allylene, —$R_b$—CH=CH—COO—$R_c$—, —$R_d$—OCO—CH=CH—$R_e$—, —$R_f$OR$_g$—, —$R_h$COOR$_i$—, or —$R_j$OCOR$_k$—. In this regard, $R_b$ to $R_k$ may be each independently a single bond or a substituted or unsubstituted alkylene group having 1 to 6 carbon atoms, and more specifically a single bond or a linear alkylene group having 1 to 6 carbon atoms such as methylene, ethylene, propylene, butylene, etc. Much more specifically, $R_a$ may be methylene, ethylene, or —$R_f$OR$_g$—, wherein $R_f$ and $R_g$ may be a direct bond or a linear alkylene group having 1 to 6 carbon atoms such as methylene, propylene, etc.

In terms of the effects of improving surface hardness and a curing property of the cured product, $R^1$ may be a glycidyl group or a glycidoxypropyl group.

When $R_a$ is substituted, it may be specifically substituted with one or more substituents selected from the group consisting of an alkyl group having 1 to 12 carbon atoms, a cycloalkyl group having 3 to 12 carbon atoms, an alkenyl group having 2 to 12 carbon atoms, a hydroxy group, an alkoxy group having 1 to 12 carbon atoms, an amino group, an acryl group (or an acryloyl group), a methacryl group (or a methacryloyl group), an acrylate group (or an acryloyloxy group), a methacrylate group (or a methacryloyloxy group), a halogen group, a mercapto group, an ether group, an ester group, an acetyl group, a formyl group, a carboxyl group, a nitro group, a sulfonyl group, a urethane group, an epoxy group, an oxetanyl group, and a phenyl group, and more specifically, one or more substituents selected from the group consisting of an alkyl group having 1 to 6 carbon atoms such as methyl, ethyl, etc.; an acryl group; a methacryl group; an acrylate group; a methacrylate group; a vinyl group; an allyl group; an epoxy group; and an oxetanyl group.

Further, the epoxy polysiloxane may further include a silsesquioxane unit of $(R^2SiO_{3/2})$ as a T3 unit, together with the above-described silsesquioxane unit of $(R^1SiO_{3/2})$. The silsesquioxane unit of $(R^2SiO_{3/2})$ may increase curing density of epoxy polysiloxane to improve a surface hardness property of the coating layer.

In the silsesquioxane unit of $(R^2SiO_{3/2})$, $R^2$ may be specifically selected from the group consisting of a substituted or unsubstituted alkyl group having 1 to 12 carbon atoms, a substituted or unsubstituted cycloalkyl group having 3 to 12 carbon atoms, a substituted or unsubstituted aryl group having 6 to 12 carbon atoms, a substituted or unsubstituted arylalkyl group having 7 to 12 carbon atoms, a substituted or unsubstituted alkylaryl group having 7 to 12 carbon atoms, an epoxy group, an oxetanyl group, an acrylate group, a methacrylate group, and a hydrogen atom.

Further, $R^2$ may be substituted with one or more substituents selected from the group consisting of an alkyl group having 1 to 12 carbon atoms, a cycloalkyl group having 3 to 12 carbon atoms, an alkenyl group having 2 to 12 carbon atoms, a hydroxy group, an alkoxy group having 1 to 12 carbon atoms, an amino group, an acryl group, a methacryl group, an acrylate group, a methacrylate group, a halogen group, a mercapto group, an ether group, an ester group, an acetyl group, a formyl group, a carboxyl group, a nitro group, a sulfonyl group, a urethane group, an epoxy group, an oxetanyl group, and a phenyl group, and more specifically, one or more substituents selected from the group consisting of an acryl group, a methacryl group, acrylate group, a methacrylate group, a vinyl group, an allyl group, an epoxy group, and an oxetanyl group.

Among them, $R^2$ may be more specifically an alkyl group having 1 to 6 carbon atoms or a phenyl group having 6 carbon atoms which is unsubstituted or substituted with one or more substituents selected from the group consisting of an acryl group, a methacryl group, an acrylate group, a methacrylate group, a vinyl group, an allyl group, an epoxy group, and an oxetanyl group; an epoxy group; or an oxetanyl group, in terms of further improving the surface hardness property of the coating layer by further increasing the curing density of epoxy polysiloxane. Much more specifically, $R^2$ may be an unsubstituted phenyl group or epoxy group.

Meanwhile, in the present invention, the 'epoxy group' is a functional group containing an oxirane ring, and may include, unless otherwise mentioned, an unsubstituted epoxy group containing only the oxirane ring, an alicyclic epoxy group having 6 to 20 carbon atoms or 6 to 12 carbon atoms (e.g., epoxycyclohexyl, epoxycyclopentyl, etc.); and an aliphatic epoxy group having 3 to 20 carbon atoms or 3 to 12 carbon atoms (a glycidyl group, etc.). However, when $R^2$ is an epoxy group, those identical to the functional group represented by Chemical Formula 2 are excluded.

In the present invention, the 'oxetanyl group' is a functional group containing an oxetane ring, and may include, unless otherwise mentioned, an unsubstituted oxetanyl group containing only the oxetane ring, an alicyclic oxetanyl group having 6 to 20 carbon atoms or 6 to 12 carbon atoms, and an aliphatic oxetanyl group having 3 to 20 carbon atoms or 3 to 12 carbon atoms.

Further, the epoxy polysiloxane may include a unit of (OR). The epoxy polysiloxane may improve flexibility while maintaining excellent hardness property by including the unit. R may be specifically a hydrogen atom or an alkyl group having 1 to 12 carbon atoms, and more specifically a hydrogen atom or a linear or branched alkyl group having 1 to 4 carbon atoms such as a methyl group, an ethyl group, a propyl group, an isopropyl group, a butyl group, an isobutyl group, etc.

The epoxy polysiloxane including the above-described units may be prepared by hydrolysis and condensation reaction of the siloxane monomers of the respective units, specifically, the alkoxysilane having an epoxyalkyl group alone or between the alkoxysilane having an epoxyalkyl group and heterogeneous alkoxysilane. In this regard, a molar ratio of the respective units may be controlled by controlling a content ratio of the alkoxysilane. Specifically, in Chemical Formula 1, a, b, and c represent a molar ratio of $(R^1SiO_{3/2})$ unit, $(R^2SiO_{3/2})$ unit, and (OR) unit which constitute the epoxy polysiloxane, and satisfy $0<a\leq1$, $0\leq b<1$, and $0\leq c<1$, and $a+b+c=1$.

Under conditions satisfying the respective content ranges of the above-described units, the epoxy polysiloxane may include 70 mole % or more, more specifically, 70 mole % or more and 100 mole % or less of the $(R^1SiO_{3/2})$ unit, based on the total weight, i.e., 100 mole % of the T units constituting the epoxy polysiloxane, thereby increasing curing density of the coating layer, and as a result, the hard coating film may exhibit remarkably improved surface hardness (expressed as a molar ratio of $0.7\leq a/(a+b)\leq1$). When the mole content of the $(R^1SiO_{3/2})$ unit in the epoxy polysiloxane is less than 70 mole %, the top and bottom coating layers hardly exhibit sufficient surface hardness due to reduction of the curing density. Much more specifically, the epoxy polysiloxane may include 70 mole % or more and less than 85 mole %, or 85 mole % or more and 100 mole % or less of $(R^1SiO_{3/2})$ unit, based on the total weight, i.e., 100 mole % of the T units.

Further, when the epoxy polysiloxane further includes the unit of $(R^2SiO_{3/2})$, it may further include the unit of $(R^2SiO_{3/2})$ at a molar ratio satisfying $0\leq b<1$, more specifically, $0\leq b<0.5$, and much more specifically $0.01\leq b<0.5$ or $0.1\leq b\leq0.3$. When the epoxy polysiloxane includes the unit of $(R^2SiO_{3/2})$ within the above content range, film density of the cured product may be increased to improve the surface hardness property of the coating layer or to change film property.

Further, the epoxy polysiloxane may further include the unit of (OR) within the above-described range of $0\leq c<1$, more specifically, at a molar ratio satisfying $0<c<0.5$, and much more specifically, at a molar ratio satisfying $0.01\leq c\leq0.3$ or $0.01\leq c\leq0.05$. When the epoxy polysiloxane includes the unit of (OR) within the above content range, flexibility may be improved while maintaining excellent hardness property.

Under conditions satisfying the above-described content ranges, the sum (a+b+c) of the molar ratios of the respective units included in the epoxy polysiloxane may be 1.

Meanwhile, in the present invention, the contents of the respective units constituting the epoxy polysiloxane may be determined by measuring $^1$H-NMR or $^{29}$Si-NMR spectra.

Further, the epoxy polysiloxane may have an epoxy equivalent weight of 3.0 mmol/g to 6.3 mmol/g. When the epoxy equivalent weight is within the above range, compact crosslinking may occur during polymerization, thereby obtaining more excellent hardness property. More specifically, the epoxy polysiloxane may have an epoxy equivalent weight of 4 mmol/g to 6 mmol/g. In the present invention, the epoxy equivalent weight may be analyzed by H-NMR or chemical titration.

Further, a weight average molecular weight and a molecular weight distribution of the epoxy polysiloxane may be controlled by controlling a reaction rate using a reaction temperature, a quantity of a catalyst, a kind of a solvent during preparation, and the epoxy polysiloxane applicable in the present invention may have a weight average molecular weight (Mw) of 1,000 to 50,000 Da (Dalton). When the epoxy polysiloxane has a weight average molecular weight within the above range, it may exhibit more excellent hardness property. When the weight average molecular weight is less than 1,000 Da, it is apprehended that the hardness may not be realized but ductility may be rather expressed. When the weight average molecular weight is more than 50,000 Da, it is apprehended that the film processability may be reduced. More specifically, the weight average molecular weight may be 1,200 Da to 15,000 Da.

Further, the epoxy polysiloxane may have a number average molecular weight (Mn) of 1,000 Da to 10,000 Da, and more specifically 1,000 Da to 8,000 Da, in addition to the above described Mw. When satisfying the above range of the number average molecular weight, compatibility of the epoxy polysiloxane with other components in the resin composition for forming the coating layer may be increased, and the surface hardness of the cured product may be improved, and thus heat resistance and abrasion resistance of the cured product may be further improved.

Further, the epoxy polysiloxane may have a molecular weight distribution (Mw/Mn) of 1.0 to 3.0, and more specifically 1.1 to 2.5. When the epoxy polysiloxane has a molecular weight distribution within the above range, the effect of improving surface hardness may be more excellent and the epoxy polysiloxane may exist as a liquid, which is easy to handle.

In the present invention, the weight average molecular weight and the number average molecular weight of the epoxy polysiloxane may be values in terms of standard polystyrene, as measured by gel permeation chromatography.

Meanwhile, in the hard coating film according to one embodiment of the present invention, the bottom coating layer may include the above-described epoxy polysiloxane and an elastomer at a weight ratio of 95:5 to 60:40.

The elastomer may be included in the bottom coating layer facing the substrate to which the hard coating film is applied, thereby providing the bottom coating layer with a stress resistance property through high toughness and minimizing shrinkage during curing. As a result, the curling property may be improved, and simultaneously, flexibility such as a bending property, etc. may be improved. In particular, the effect of improving flexibility may be obtained while maintaining excellent hardness property, as compared with the case where the elastomer is included in the top coating layer. However, when an excessively large amount of the elastomer is added, specifically, when the amount is more than 40% by weight, based on the total weight of the epoxy polysiloxane and the elastomer, it is apprehended that the curling property may be greatly reduced. Further, when an excessively small amount of the elastomer is added, specifically, when the amount is less than 5% by weight, based on the total weight of the epoxy polysiloxane and the elastomer, it is apprehended that the improvement effect due to the elastomer may not be sufficient and the curling and bending properties may be reduced. More specifically, considering that the curling and bending properties may be remarkably improved by controlling the content ratio of the elastomer, the elastomer may be included in an amount such that the weight ratio of the epoxy polysiloxane of Chemical Formula 1 and the elastomer satisfies 92:8 to 65:35, more specifically, 90:10 to 65:35.

The elastomer may include alkane diols having 1 to 20 carbon atoms, polyolefin polyols, polyester polyols, polycaprolactone polyol, polyether polyols, polycarbonate polyols, etc., and any one thereof or a mixture of two or more thereof may be used. These elastomers may be crosslinked and polymerized by UV irradiation, unlike common elastomers such as rubbers, etc., and may realize high hardness and flexibility without deterioration of other physical properties. Among them, the elastomer may be polycaprolactone diol or polycarbonate diol. In particular, since the polycaprolactone diol includes both of an ester group and an ether group in a repeating unit, a combination of the polycaprolactone diol and the epoxy polysiloxane of Chemical Formula 1 may be used to obtain more excellent effects in terms of flexibility, hardness, and impact resistance.

Further, the elastomer may have a number average molecular weight (Mn) of 500 Da to 10,000 Da, and more specifically, 1,000 Da to 5,000 Da. When the number average molecular weight of the elastomer satisfies the above condition, compatibility of the elastomer with other components in the resin composition for forming the coating layer may be improved, and the surface hardness of the cured product may be improved, and thus heat resistance and abrasion resistance of the cured product may be further improved.

Additionally, in the hard coating film according to one embodiment of the present invention, the top coating layer may also further include the elastomer together with the epoxy polysiloxane. When the elastomer is also included in the top coating layer, shrinkage of the top coating layer during curing may be minimized, thereby further improving the curling and bending properties.

In this case, the top coating layer may include the elastomer such that a weight ratio of the epoxy polysiloxane of Chemical Formula 1 and the elastomer satisfies 95:5 to 60:40, more specifically, 92:8 to 65:35.

When the top coating layer may further include the elastomer, the contents of the elastomers included in the top coating layer and the bottom coating layer may be equal to or different from each other. Considering that the surface hardness property, curling property, and bending property of the hard coating film may be improved by minimizing shrinkage in the bottom coating layer facing the substrate to which the hard coating film is applied, the hard coating film according to one embodiment of the present invention may have a higher content of the elastomer in the bottom coating layer than in the top coating layer.

Further, in the hard coating film according to one embodiment of the present invention, at least one of the top and bottom coating layers may further include a reactive monomer.

When the reactive monomer may include one or more functional groups crosslinkable with the above-described epoxy polysiloxane, viscosity of the epoxy polysiloxane may be lowered to facilitate processability and to improve a coating adhesion force.

Specifically, the reactive monomer may be a compound containing an alicyclic epoxy group, a glycidyl group, or an oxetanyl group as a functional group crosslinkable with the epoxy polysiloxane, and any one thereof or a mixture of two or more thereof may be used.

The compound containing an alicyclic epoxy group may include 4-vinylcyclohexene dioxide, cyclohexene vinyl monoxide, (3,4-epoxycyclohexyl)methyl 3,4-epoxycyclohexylcarboxylate, 3,4-epoxycyclohexylmethyl methacrylate, 3,4-epoxycyclohexanecarboxylate, 2-(3,4-epoxycyclohexyl)-1,3-dioxolane, limonene dioxide, vinylcyclohexene dioxide, bis(3,4-epoxycyclohexylmethyl)adipate, etc. Among them, any one thereof or a mixture of two or more thereof may be used. The compound containing a glycidyl group may include bisphenol A diglycidyl ether, p-butyl phenyl glycidyl ether, butyl glycidyl ether, cresyl glycidyl ether, allyl glycidyl ether, phenyl glycidyl ether, diglycidyl ether, butanediol diglycidyl ether, diethylene glycol diglycidyl ether, etc. Among them, any one thereof or a mixture of two or more thereof may be used. The compound containing an oxetanyl group may include 3-methyloxetane, 2-methyloxetane, 3-oxetanol, 2-methyleneoxetane, 3-methyl-3-hydroxymethyloxetane, 3-ethyl-3-hydroxymethyloxetane, 3,3-oxetanedimethanethiol, 2-ethylhexyloxetane, 4-(3-methyloxetan-3-yl)benzonitrile, N-(2,2-dimethylpropyl)-3-methyl-3-oxetanemethanamine, N-(1,2-dimethylbutyl)-3-methyl-3-oxetanemethanamine, xylene bisoxetane, 3-ethyl-3[{(3-ethyloxetan-3-yl)methoxy}methyl]oxetane, (3-ethyloxetan-3-yl)methyl methacrylate, 4-[(3-ethyloxetan-3-yl)methoxy]butan-1-ol, etc. Among them, any one thereof or a mixture of two or more thereof may be used.

When the reactive monomer may be further included, it may be included in an amount of 5 parts by weight to 30 parts by weight, based on 100 parts by weight of the epoxy polysiloxane. When the content of the reactive monomer is less than 5 parts by weight, the improvement effect obtained by including the reactive monomer may be insignificant. When the content of the reactive monomer is more than 30 parts by weight, viscosity of the epoxy polysiloxane may be excessively lowered due to the excessive reactive monomer, and thus processability may be rather reduced. The reactive monomer may be more specifically included in an amount of 7 parts by weight to 15 parts by weight, and much more specifically, 9 parts by weight to 12 parts by weight, based on 100 parts by weight of the epoxy polysiloxane.

Further, in the hard coating film according to one embodiment of the present invention, at least one of the top and bottom coating layers may further include an acrylate-based compound to improve surface hardness.

The acrylate-based compound may include 2-ethylhexyl acrylate, octadecyl acrylate, isodecyl acrylate, 2-phenoxyethyl acrylate, lauryl acrylate, stearyl acrylate, behenyl acrylate, tridecyl methacrylate, nonylphenolethoxylate monoacrylate, β-carboxyethyl acrylate, isobornyl acrylate, tetrahydrofurfuryl acrylate, tetrahydrofurfuryl methacrylate, 4-butylcyclohexyl acrylate, dicyclopentenyl acrylate, dicyclopentenyl oxyethyl acrylate, ethoxyethoxyethyl acrylate, ethoxylated monoacrylate, 1,6-hexanediol diacrylate, triphenyl glycol diacrylate, butanediol diacrylate, 1,3-butyleneglycol dimethacrylate, 1,6-hexanediol dimethacrylate, neopentylglycol diacrylate, ethyleneglycol dimethacrylate, diethyleneglycol diacrylate, diethyleneglycol dimethacrylate, tetraethyleneglycol diacrylate, tetraethyleneglycol dimethacrylate, triethyleneglycol diacrylate, triethylene glycol dimethacrylate, polyethyleneglycol diacrylate, polyethyleneglycol dimethacrylate, dipropylene glycol diacrylate, ethoxylated neopentylglycol diacrylate, trimethylolpropane triacrylate, trimethylolpropane trimethacrylate, pentaerythritol triacrylate, pentaerythritoltrimethacrylate, pentaerythritoltetramethacrylate, pentaerythritoltetraacrylate, ethoxylated triacrylate, tris(2-hydroxyethyl)isocyanurate triacrylate, dipentaerythritol pentaacrylate, ditrimethylolpropane tetraacrylate, alkoxylated tetraacrylate, etc., preferably, multifunctional acrylate-based compounds such as pentaerythritol triacrylate, pentaerythritoltrimethacrylate, pentaerythritoltetramethacrylate, pentaerythritoltetraacrylate, etc. Among them, any one thereof or a mixture of two or more thereof may be used.

Acrylate-based oligomers such as polyester acrylate, polyether acrylate, urethane acrylate, epoxy acrylate, etc. may be also exemplified. Among them, any one thereof or a mixture of two or more thereof may be used.

Among the above-described acrylate-based compounds, the urethane acrylate oligomer may be more preferably used, considering that when it is used in combination with the above-described epoxy polysiloxane, the effect of improving the surface hardness is remarkable.

The number of functional groups of the urethane acrylate oligomer may be 6 to 9. When the number of functional groups is less than 6, the effect of improving the hardness may be insignificant. When the number of functional groups is more than 9, the hardness may be excellent, but viscosity may increase. As the urethane (meth)acrylate oligomer, those used in the art may be used without limitation. Preferably, a urethane (meth)acrylate oligomer prepared by reacting a compound having one or more isocyanate groups in its molecule with a (meth)acrylate compound having one or more hydroxyl groups in its molecule may be used.

When the acrylate-based compound is further included, it may be included in an amount of 0.1 part by weight to 20 parts by weight, based on 100 parts by weight of the epoxy polysiloxane. When the content of the reactive monomer is less than 0.1 part by weight, the improvement effect obtained by including the acrylate-based compound may be insignificant. When the content of the reactive monomer is more than 20 part by weight, the effect of improving the surface hardness may be rather deteriorated due to the excessive acrylate-based compound. The acrylate-based compound may be more specifically included in an amount of 1 part by weight to 15 parts by weight, and much more specifically, 5 parts by weight to 15 parts by weight, based on 100 parts by weight of the epoxy polysiloxane.

In addition to the above-described components, the top coating layer and the bottom coating layer each independently may further include one or more additives commonly used in the art to which the present invention pertains, such as an initiator, a fluorine-based compound, an antioxidant, a surfactant, a yellowing inhibitor, an inorganic filler, a lubricant, a coating aid, an antifouling agent, etc. These additives will be described in more detail in the preparation method below.

Generally, as the hard coating layer is thicker, hardness increases. However, when the hard coating layer is too thick, it is easily broken when folded. When the hard coating layer is too thin, hardness may be poor even though foldability may be secured. Therefore, in the hard coating film according to one embodiment of the present invention, the top coating layer and the bottom coating layer may preferably have a thickness of 30 µm to 150 µm, respectively. Within the above range of thickness, a thickness ratio of the top coating layer and the bottom coating layer may be 0.5:1 to 1:1.5, and more specifically 1:1 to 1:1.3. When the thickness of each coating layer is less than 30 µm, it is apprehended that the hardness property may deteriorate. When the thickness of each coating layer is more than 150 µm, it is apprehended that flexibility may deteriorate. Further, when the bottom coating layer is much thicker than the top coating layer, it is apprehended that high hardness relative to curl balance and thickness may deteriorate. When the top coating layer is much thicker than the bottom coating layer, it is apprehended that curl balance and flexibility may deteriorate.

Meanwhile, the support substrate layer in the hard coating film according to one embodiment of the present invention is disposed between the top coating layer and the bottom coating layer.

The support substrate layer may include a transparent plastic resin. Specific examples of the plastic resin may include polyester-based resins, cellulose-based resins, polycarbonate-based resins, acrylic-based resins, styrene-based resins, polyolefin-based resins, polyimide-based resins, polyether sulfone-based resins, sulfone-based resins, etc. Among them, any one thereof or a mixture of two or more thereof may be used.

More specifically, the support substrate layer may include at least one of polyethyleneterephtalate (PET), a cyclic olefin copolymer (COC), polyacrylate (PAC), polycarbonate (PC), polyethylene (PE), polymethylmethacrylate (PMMA), polyetheretherketone (PEEK), polyethylenenaphthalate (PEN), polyetherimide (PEI), polyimide (PI), poly(amide-imide), and triacetylcellulose (TAC).

Further, the support substrate layer may have a single layer or a multilayer structure including two or more layers composed of substances which are the same as or different from each other. For example, the support substrate layer may have a multilayer structure of polyethyleneterephtalate (PET), a multilayer structure formed by co-extrusion of polymethylmethacrylate (PMMA)/polycarbonate (PC), or a single layer structure including a copolymer of polymethylmethacrylate (PMMA) and polycarbonate (PC).

Further, the support substrate layer may be surface-treated with plasma, as needed. The surface-treatment method may be, but is not particularly limited to, performed according to a common method.

Further, the support substrate layer may have a thickness of 30 μm to 1,200 μm, more specifically 50 μm to 800 μm, and much more specifically 30 μm to 100 μm.

The hard coating film having the above-described structure and construction according to one embodiment of the present invention may be manufactured by applying the first resin composition for forming the top coating layer onto one surface of the support substrate layer and curing the composition to form the top coating layer, and then applying the second resin composition for forming the bottom coating layer onto the other surface of the support substrate layer, on which the top coating layer is not formed, and curing the composition to form the bottom coating layer. In this regard, the order of forming the top coating layer and the bottom coating layer may be changed. Another method is to manufacture the hard coating film by applying the first resin composition and the second resin composition on both surfaces of the support substrate layer, respectively and curing the compositions. In this regard, the order of forming the top coating layer and the bottom coating layer is not particularly limited, and appropriately changed from the viewpoint of easy processability, etc.

In the method of manufacturing the hard coating film, the first resin composition for forming the top coating layer may include the epoxy polysiloxane represented by Chemical Formula 1, and optionally, the elastomer. Further, the second resin composition for forming the bottom coating layer may include the epoxy polysiloxane and the elastomer at a weight ratio of 95:5 to 60:40. In this regard, the epoxy polysiloxane and the elastomer are the same as described above.

Further, the first and second resin compositions may further include at least one of the above-described reactive monomers and acrylate-based compounds.

The first and second resin compositions each independently may include an initiator in an amount of 0.1 part by weight to 10 parts by weight, based on 100 parts by weight of the epoxy polysiloxane. When the content of the initiator is less than 0.1 part by weight, only the surface may be cured or sufficient epoxy curing may not occur, and thus hardness may become low. When the content of the initiator is more than 10 part by weight, the curing may rapidly occur to cause cracking and peeling of the hard coating layer. More specifically, the initiator may be included in an amount of 0.5 parts by weight to 5 parts by weight or 1 part by weight to 4 parts by weight.

The initiator may be a photo-polymerization initiator or a thermal polymerization initiator well known in the art, and a kind thereof is not particularly limited. For example, the photo-polymerization initiator may include one or more selected from the group consisting of aryl sulfonium hexafluoroantimonate salt, an aryl sulfonium hexafluorophosphate salt, a diphenyliodonium hexafluorophosphate salt, a diphenyliodonium hexafluoroantimonate salt, a ditolyliodonium hexafluorophosphate salt, and a 9-(4-hydroxyethoxyphenyl)thianthrenium hexafluorophosphate salt, but is not limited thereto. The thermal polymerization initiator may include one or more selected from the group consisting of a 3-methyl-2-butenyltetramethylenesulfonium hexafluoroantimonate salt, an ytterbium trifluoromethanesulfonate salt, a samarium trifluoromethanesulfonate salt, an erbium trifluoromethanesulfonate salt, a dysprosium trifluoromethanesulfonate salt, a lanthanum trifluoromethanesulfonate salt, a tetrabutylphosphonium methanesulfonate salt, an ethyltriphenylphosphonium bromide salt, benzyldimethylamine, dimethylaminomethylphenol, triethanolamine, N-n-butylimidazole, and 2-ethyl-4-methylimidazole, but is not limited thereto.

The first and second resin compositions may be solvent-free compositions, when there is no problem in the process. However, the compositions may optionally include an organic solvent to adjust viscosity and fluidity of the compositions upon coating and to increase coating property of the compositions with respect to the support substrate.

When an organic solvent is further included in the first and second resin compositions, the organic solvent may include alcohol-based solvents such as methanol, ethanol, isopropyl alcohol, and butanol; alkoxy alcohol-based solvents such as 2-methoxy ethanol, 2-ethoxy ethanol, and 1-methoxy-2-propanol; ketone-based solvents such as acetone, methyl ethyl ketone, methyl isobutyl ketone, methyl propyl ketone, and cyclohexanone; ether-based solvents such as propyleneglycol monopropyl ether, propyleneglycol monomethyl ether, ethyleneglycolmonoethyl ether, ethyleneglycol monopropyl ether, ethyleneglycol monobutyl ether, diethyleneglycol monomethyl ether, diethyleneglycol monoethyl ether, diethyleneglycol monopropyl ether, diethyleneglycol monobutyl ether, and diethyleneglycol-2-ethylhexyl ether; acetate-based solvents such as propyleneglycol monomethylether acetate, ethyleneglycol monoethylether acetate, diethyleneglycol monobutylether acetate, diethyleneglycol monoethylether acetate, etc.; and aromatic solvents such as benzene, toluene, and xylene. These organic solvents may be used alone or in combination.

Further, the first and second resin compositions may further include an acrylate-based compound to improve the surface hardness as described above, in addition to the above-described components. In addition, the first and second resin compositions may further include one or more additives commonly used in the art to which the present invention pertains, such as an antioxidant, a surfactant, a yellowing inhibitor, an inorganic filler, a lubricant, a coating aid, an antifouling agent, etc. The content thereof is not particularly limited, because it may be variously adjusted within the range that does not deteriorate the physical properties of the hard coating film of the present invention. For example, they may be included in an amount of about 0.1 part by weight to 10 parts by weight, based on 100 parts by weight of the epoxy polysiloxane.

For example, the antioxidant is to prevent oxidation caused by the polymerization initiator, and may include a mixture of one or more selected from the group consisting of phenolic antioxidants, phosphate antioxidants, aminic antioxidants, and thioester antioxidants, but is not limited thereto. The surfactant may be a mono- or bi-functional fluorine-based acrylate, a fluorine-based surfactant, or a silicon-based surfactant. In this regard, the surfactant may be included in a dispersed or crosslinked form in the crosslinking copolymer. Further, the yellowing inhibitor may be a benzophenone-based compound, a benzotriazole-based compound, etc.

A method of applying the resin compositions for forming the top and bottom coating layers onto the support substrate layer may be performed by a known method such as die coater, air knife, reverse roll, spray, blade, casting, gravure, spin coating, bar coating, etc.

The processes of applying the first and second resin compositions may be performed once or more such that the respective coating layers satisfy the above-described thickness ranges and conditions after curing.

After applying the respective resin compositions, a process for curing may be performed. The curing may be performed by thermal curing or photo-curing according to a common method.

The thermal treatment or light irradiation conditions for the thermal curing or photo-curing may be appropriately controlled by adjusting a wavelength range and a light dose, a heat treatment temperature, etc. according to the kind of the initiator.

In the hard coating film according to one embodiment of the present invention, which is manufactured according to the above-described method, as hard coating layers, the top coating layer including the epoxy polysiloxane having excellent hardness property is formed on the top surface of the support substrate layer, and the bottom coating layer including the epoxy polysiloxane together with the elastomer capable of improving the curling property, bending property, and flexibility at the same time by minimizing shrinkage upon curing is formed on the bottom surface of the support substrate layer. Therefore, the hard coating film may have remarkably improved flexibility while maintaining excellent surface hardness and strength properties, thereby having very small curling deformation. Accordingly, the hard coating film may be used as a flexible transparent film or a foldable transparent film, and in particular, may be usefully applied to front panels and display windows of various flexible or foldable display devices.

According to still another embodiment of the present invention, provided is a display device including the above-described hard coating film.

The display device may include a variety of common display devices such as a liquid crystal display device, an electroluminescence display device, a plasma display device, a field emission display device, etc., and the hard coating film may be used in a window substrate, etc. in the display devices.

Advantageous Effects

A hard coating film according to the present invention may exhibit improved flexibility and curling property together with excellent hardness property. Accordingly, the hard coating film may be usefully applied to flexible or foldable display devices.

DETAILED DESCRIPTION OF THE EMBODIMENTS

The present invention will be described in more detail in the following Examples. However, the following Examples are for illustrative purposes only, and the scope of the present invention is not intended to be limited by the following Examples.

Compounds used in the following Preparation Examples are as follows:

(a) Epoxy polysiloxane 1

Epoxy polysiloxane 1 prepared according to the following method was used.

To a 1000 mL 3-neck flask, 3-glycidoxypropyltrimethoxysilane (KBM-403™, Shinetsu Chemical Co., Ltd.) as a silane monomer, water, and toluene were introduced and stirred (KBM-403™:water=1 mol:0.2 mol). To the resulting mixture, a basic catalyst (trimethylammonium hydroxide; TMAH) was added in an amount of 1 part by weight, based on 100 parts by weight of the silane monomer, and allowed to react at 100° C. to prepare 100 mol % of glycidoxypropyl modified silicone (hereinafter, referred to as GP)—containing epoxy polysiloxane 1 of the following composition (Mw: 2,700 Da, Mn: 2,100 Da, a molecular weight distribution (Mw/Mn): 1.29, an epoxy equivalent weight: 5.9 mmol/g).

$$(R^1SiO_{3/2})_a(R^2SiO_{3/2})_b(OR)_c \quad (1)$$

(in Chemical Formula 1, $R^1$ is a glycidoxypropyl group (in Chemical Formula 2, $R_a$ is —$R_fOR_g$—, $R_f$ is a propylene group, and $R_g$ is a methylene group), R is a hydrogen atom, and a=0.96, b=0, and c=0.04)

(b) Epoxy polysiloxane 2

Epoxy polysiloxane 2 prepared according to the following method was used.

To a 1000 mL 3-neck flask, 3-glycidoxypropyltrimethoxysilane (KBM-403™, Shinetsu Chemical Co., Ltd.) and 2-(3,4-epoxycyclohexyl)ethyltrimethoxysilane (KBM-303™, Shin-Etsu Chemical Co., Ltd.) as silane monomers, water, and toluene were introduced and stirred (KBM-403™:KBM-303™:water=7 mol:3 mol:2 mol). To the resulting mixture, a basic catalyst (TMAH) was added in an amount of 1 part by weight, based on 100 parts by weight of the silane monomers, and allowed to react at 100° C. to prepare the epoxy polysiloxane 2 (Mw: 2,500 Da, Mn: 1,750 Da, a molecular weight distribution (Mw/Mn): 1.43, an epoxy equivalent weight: 5.9 mmol/g).

$$(R^1SiO_{3/2})_a(R^2SiO_{3/2})_b(OR)_c \quad (1)$$

(in Chemical Formula 1, $R^1$ is a glycidoxypropyl group (in Chemical Formula 2, $R_a$ is —$R_fOR_g$—, $R_f$ is a propylene group, and $R_g$ is a methylene group), $R^2$ is a 2-(3,4-epoxycyclohexyl)ethyl group, R is a hydrogen atom, and a=0.68, b=0.29, and c=0.03)

(c) Epoxy polysiloxane 3

Epoxy polysiloxane 3 prepared according to the following method was used.

To a 1000 mL 3-neck flask, 3-glycidoxypropyltrimethoxysilane (KBM-403™, Shinetsu Chemical Co., Ltd.) and phenyltrimethoxysilane (PTMS, Shin-Etsu Chemical Co., Ltd.) as silane monomers, water, and toluene were introduced and stirred (KBM-403™: PTMS: water=7 mol: 3 mol: 2 mol). To the resulting mixture, a basic catalyst (TMAH) was added in an amount of 1 part by weight, based on 100 parts by weight of the silane monomers, and allowed to react at 100° C. to prepare the epoxy polysiloxane 3 (Mw: 2,800 Da, Mn: 2,100 Da, a molecular weight distribution (Mw/Mn): 1.33, an epoxy equivalent weight: 4.5 mmol/g).

$$(R^1SiO_{3/2})_a(R^2SiO_{3/2})_b(OR)_c \quad (1)$$

(in Chemical Formula 1, $R^1$ is a glycidoxypropyl group (in Chemical Formula 2, $R_a$ is —$R_fOR_g$—, $R_f$ is a propylene group, and $R_g$ is a methylene group), $R^2$ is a phenyl group, R is a hydrogen atom, and a=0.69, b=0.29, and c=0.02)

(d) Reactive monomer: bisphenol A diglycidyl ether (Alfa)
(e) Elastomer 1: polycaprolactone diol (Mn=1300 Da, a product of Sigma Aldrich).
(f) Elastomer 2: polycarbonate diol (Mn=2,000 Da, a product of Sigma Aldrich).

PREPARATION EXAMPLES 1 to 8

Respective resin compositions were prepared by blending the components described in the following Table 1. In this regard, based on 100 parts by weight of the epoxy polysiloxane, 3 parts by weight of an iodonium-based compound (Omnicat 250™, a product of BASF) as an initiator, 10 parts by weight of toluene as a solvent, and 0.2 parts by weight of a fluorine-based compound (RS-55™, a product of MEGAFACE) as an additive were used.

TABLE 1

|  |  | Preparation Example 1 | Preparation Example 2 | Preparation Example 3 | Preparation Example 4 | Preparation Example 5 | Preparation Example 6 | Preparation Example 7 | Preparation Example 8 |
|---|---|---|---|---|---|---|---|---|---|
| Mixing ratio (wt %) | Epoxy polysiloxane 1 | 91 | 84 | 71 | 63 | 63 | — | — | 52 |
|  | Epoxy polysiloxane 2 | — | — | — | — | — | 84 | — | — |
|  | Epoxy polysiloxane 3 | — | — | — | — | — | — | 84 | — |
|  | Reactive monomer | 9 | 8 | 8 | — | — | 8 | 8 | 5 |
|  | Elastomer 1 | — | 8 | 21 | 37 | — | 8 | 8 | 43 |
|  | Elastomer 2 | — | — | — | — | 37 | — | — | — |

In Table 1, the content unit "wt %" is a value expressed as a percentage of the weight of the corresponding component, based on the total weight of the resin composition including the epoxy polysiloxane, the reactive monomer, and the elastomer.

EXAMPLES 1 to 8

Each hard coating film, wherein top and bottom coating layers were formed on the top and bottom surfaces of a substrate, respectively, was manufactured by using each resin composition having the composition described in the following Table 2.

In detail, the second resin composition for forming the bottom coating layer which is described in the following Table 2 was applied onto one surface of a PET substrate with a size of 15 cm×20 cm and a thickness of 50 μm, and then subjected to photocuring by UV irradiation (light dose: 400 mJ/cm²) using a UV lamp, thereby forming the bottom coating layer. The first resin composition for forming the top coating layer which is described in the following Table 2 was applied onto the other surface opposite to the surface of the PET substrate onto which the bottom coating layer was formed, and then subjected to photocuring by UV irradiation (light dose: 400 mJ/cm²) using a UV lamp, thereby manufacturing the hard coating film (thickness of the top coating layer: 80 μm, thickness of the bottom coating layer: 100 μm, whole thickness: 230 μm).

COMPARATIVE EXAMPLE 1

As described in the following Table 2, the resin composition prepared in Preparation Example 1 was applied onto the top surface of a PET substrate with a size of 15 cm × 20 cm and a thickness of 50 μm, and then subjected to photocuring by UV irradiation (light dose: 200 mJ/cm²) for 10 seconds using a UV lamp, thereby manufacturing a hard coating film (thickness of the top coating layer: 80 μm) having the top coating layer formed on the top surface of the substrate.

COMPARATIVE EXAMPLES 2 and 3

A hard coating film was manufactured in the same manner as in Example 1, except that the resin composition of the following Table 2 was used.

TABLE 2

|  | First resin composition for forming top coating layer | Second resin composition for forming bottom coating layer |
|---|---|---|
| Example 1 | Preparation Example 1 | Preparation Example 3 |
| Example 2 | Preparation Example 1 | Preparation Example 4 |
| Example 3 | Preparation Example 2 | Preparation Example 3 |
| Example 4 | Preparation Example 2 | Preparation Example 4 |
| Example 5 | Preparation Example 2 | Preparation Example 5 |
| Example 6 | Preparation Example 6 | Preparation Example 4 |
| Example 7 | Preparation Example 7 | Preparation Example 4 |
| Example 8 | Preparation Example 4 | Preparation Example 4 |
| Comparative Example 1 | Preparation Example 1 | — |
| Comparative Example 2 | Preparation Example 2 | Preparation Example 8 |
| Comparative Example 3 | Preparation Example 1 | Preparation Example 1 |

EXPERIMENTAL EXAMPLE

Physical properties of the hard coating films manufactured in Examples 1 to 7 and Comparative Examples 1 and 2 were measured by the following methods, and the results are shown in the following Table 3.

1) Pencil hardness (Top coating layer)

The top coating layer of each of the hard coating films manufactured in Examples 1 to 7 and Comparative Examples 1 and 2 was doubly rubbed five times using a pencil hardness tester under a load of 1.0 kg in accordance with standard JIS K5400 to determine the hardness at which no scratches appeared.

2) Inward bending property

While varying an inner radius of curvature (R) of the folded portion, each of the hard coating films manufactured in Examples and Comparative Examples was folded and unfolded 200,000 times such that the coating layer-formed surface was folded inward, in other words, when the coating layer was formed on only one surface of the support substrate, the coating layer-formed surface was folded inward, and when the coating layer was formed on both surfaces of the support substrate, the top coating layer was folded inward. The occurrence of cracks was examined, and the inner radius of curvature (R) of the folded portion was measured, and the smallest radius of curvature (R) having no cracks was examined.

3) Curling property: when the hard coating film was placed on the floor, the heights of the four edges of the hard coating film from the floor were measured, and a mean value thereof was determined to evaluate the curling property according to the following criteria.

Less than 5 mm: ○
5 mm or more and less than 10 mm: △
10 mm or more: X

These results indicate that when the bottom coating layer includes the elastomer and the epoxy polysiloxane at the optimal content ratio, the effects of improving the hardness property, flexibility, and curling property may be obtained.

Further, to evaluate the effects of improving the flexibility and curling property according to the presence of the elastomer in the coating layer when the coating layers having the same compositions are formed on both of the top and bottom surfaces of the support substrate layer, inward bending property and outward bending property, and curling property of the coating films manufactured in Example 8 and Comparative Example 3 were evaluated, respectively.

The inward bending property was measured in the same manner as above.

Outward bending property: While varying an inner radius of curvature (R) of the folded portion, each of the hard coating films manufactured in Examples and Comparative Examples was folded and unfolded 200,000 times such that the coating layer-formed surface was folded outward, in other words, when the coating layer was formed on only one surface of the support substrate, the surface on which the coating layer was not formed was folded inward, and when the coating layer was formed on both surfaces of the support substrate, the bottom coating layer was folded inward. The occurrence of cracks was examined, and the inner radius of curvature (R) of the folded portion was measured, and the smallest radius of curvature (R) having no cracks was examined Additionally, the surface hardness and curling properties of the top coating layer of each of the hard coating films

TABLE 3

| | Example 1 | Example 2 | Example 3 | Example 4 | Example 5 | Example 6 | Example 7 | Comparative Example 1 | Comparative Example 2 |
|---|---|---|---|---|---|---|---|---|---|
| Pencil hardness | 9H | 9H | 8H | 8H | 8H | 9H | 7H | 9H | 9H |
| Inward bending property | 4R | 2.5R | 4R | 2.5R | 2.5R | 2.5R | 2.5R | 2.5R | NG |
| Curling property | ○ | ○ | ○ | ○ | ○ | ○ | ○ | X | X |

The experimental results showed that the hard coating films of Examples 1 to 7, each hard coating film having the hard coating layers on both the top and bottom surfaces of the support substrate layer and including the optimal amount of the elastomer in the bottom coating layer, exhibited remarkably improved inward bending property and curling property while exhibiting excellent hardness property equivalent to those of Comparative Examples 1 and 2.

In contrast, the hard coating film of Comparative Example 1, the hard coating film having the coating layer only on the top surface of the support substrate layer and including no elastomer in the coating layer, exhibited excellent surface hardness property of the top coating layer but greatly reduced curling property.

Generally, as the elastomer is included in the coating layer and the content thereof is increased, surface hardness of the coating layer is reduced but flexibility and curling properties are improved. However, the hard coating film of Comparative Example 2, the hard coating film having the coating layers each on the top and bottom surfaces of the support substrate layer but including the elastomer in the amount exceeding the optimal mixing ratio of the epoxy polysiloxane and the elastomer in the bottom coating layer, exhibited greatly reduced inward bending property and curling property.

manufactured in Example 8 and Comparative Example 3 were also measured and evaluated in the same manner as above.

The results are shown in Table 4 below.

TABLE 4

| | Example 8 | Comparative Example 3 |
|---|---|---|
| Pencil hardness | 5H | 9H |
| Inward bending property | 2.5R | N.G. |
| Outward bending property | 2.5R | N.G. |
| Curling property | ○ | ○ |

The experimental results showed that Example 8 including the elastomer in the top and bottom coating layers of the support substrate layer exhibited relatively reduced hardness property, as compared with Comparative Example 3, but exhibited hardness property equivalent to that of a common hard coating film, and remarkable improvement in terms of inward bending property and outward bending property, as compared with Comparative Example 3.

What is claimed is:

1. A hard coating film comprising:
a support substrate layer;
a top coating layer disposed on the top surface of the support substrate layer; and
a bottom coating layer disposed on the bottom surface of the support substrate layer,
wherein the top coating layer comprises a cured product of a first resin composition comprising epoxy polysiloxane of Chemical Formula 1, and
the bottom coating layer comprises a cured product of a second resin composition comprising epoxy polysiloxane of Chemical Formula 1 and an elastomer at a weight ratio of 95:5 to 60:40, and
a thickness ratio of the top coating layer and the bottom coating layer is 1:1.25 to 1:1.5:

$(R^1SiO_{3/2})_a(R^2SiO_{3/2})_b(OR)_c$     [Chemical Formula 1]

wherein in the Chemical Formula 1, $R^1$ is a functional group represented by Chemical Formula 2,

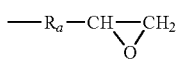
    [Chemical Formula 2]

wherein in the Chemical Formula 2, $R_a$ is selected from the group consisting of a substituted or unsubstituted alkylene group having 1 to 6 carbon atoms, a substituted or unsubstituted alkenylene group having 2 to 20 carbon atoms, a substituted or unsubstituted alkynylene group having 2 to 20 carbon atoms, —$R_b$—CH═CH—COO—$R_c$—, —$R_d$—OCO—CH═CH—$R_e$—, —$R_f$OR$_g$—, —$R_h$COOR$_i$—, and —$R_j$OCOR$_k$—,
$R_b$ to $R_k$ are each independently a single bond, or a substituted or unsubstituted alkylene group having 1 to 6 carbon atoms,
$R^2$ is selected from the group consisting of a substituted or unsubstituted alkyl group having 1 to 20 carbon atoms, a substituted or unsubstituted cycloalkyl group having 3 to 20 carbon atoms, a substituted or unsubstituted alkenyl group having 2 to 20 carbon atoms, a substituted or unsubstituted alkynyl group having 2 to 20 carbon atoms, a substituted or unsubstituted aryl group having 6 to 20 carbon atoms, a substituted or unsubstituted arylalkyl group having 7 to 20 carbon atoms, a substituted or unsubstituted alkylaryl group having 7 to 20 carbon atoms, an epoxy group, an oxetanyl group, an acrylate group, a methacrylate group, and a hydrogen atom,
R is a hydrogen atom or an alkyl group having 1 to 20 carbon atoms, and
$0 < a \leq 1$, $0 \leq b < 1$ and $0 \leq c < 1$, and $a+b+c=1$.

2. The hard coating film of claim 1, wherein the Chemical Formula 1 satisfies $0.7 \leq a/(a+b) \leq 1$.

3. The hard coating film of claim 2, wherein the Chemical Formula 1 satisfies $0 \leq b < 0.5$ and $0 < c < 0.5$.

4. The hard coating film of claim 1, wherein $R^1$ is a glycidyl group or a glycidoxypropyl group.

5. The hard coating film of claim 1, wherein $R^2$ is substituted with at least one group selected from the group consisting of an alkyl group having 1 to 12 carbon atoms, a cycloalkyl group having 3 to 12 carbon atoms, an alkenyl group having 2 to 12 carbon atoms, a hydroxy group, an alkoxy group having 1 to 12 carbon atoms, an amino group, an acryl group, a methacryl group, an acrylate group, a methacrylate group, a halogen group, a mercapto group, an ether group, an ester group, an acetyl group, a formyl group, a carboxyl group, a nitro group, a sulfonyl group, a urethane group, an epoxy group, an oxetanyl group, and a phenyl group.

6. The hard coating film of claim 1, wherein $R^2$ is an alkyl group having 1 to 6 carbon atoms a phenyl group; an epoxy group; an oxetanyl group; an acrylate group; or a methacrylate group, and R is a hydrogen atom or an alkyl group having 1 to 4 carbon atoms, wherein the alkyl group having 1 to 6 carbon atoms and the phenyl group are unsubstituted or substituted with at least one group selected from the group consisting of an acryl group, a methacryl group, an acrylate group, a methacrylate group, a vinyl group, an allyl group, an epoxy group, and an oxetanyl group.

7. The hard coating film of claim 1, wherein the epoxy polysiloxane has an epoxy equivalent weight of 3.0 mmol/g to 6.3 mmol/g, a weight average molecular weight of 1,000 Da to 50,000 Da, a number average molecular weight of 1,000 Da to 10,000 Da and a molecular weight distribution of 1.0 to 3.0.

8. The hard coating film of claim 1, wherein the elastomer is selected from the group consisting of alkane diols having 1 to 20 carbon atoms, polyolefin polyols, polyester polyols, polycaprolactone polyols, polyether polyols, polycarbonate polyols, and mixtures thereof.

9. The hard coating film of claim 1, wherein the elastomer is polycaprolactone diol or polycarbonate diol.

10. The hard coating film of claim 1, wherein the first resin composition further comprises an elastomer.

11. The hard coating film of claim 1, wherein at least one of the first and second resin compositions further comprise a reactive monomer having at least one functional group crosslinkable with the epoxy polysiloxane.

12. The hard coating film of claim 11, wherein the functional group is an alicyclic epoxy group, a glycidyl group, or an oxetanyl group.

13. The hard coating film of claim 11, wherein the reactive monomer is selected from the group consisting of bisphenol A diglycidyl ether, 4-vinylcyclohexene dioxide, cyclohexene vinyl monoxide, (3,4-epoxycyclohexyl)methyl 3,4-epoxycyclohexylcarboxylate, 3,4-epoxycyclohexylmethyl methacrylate, 3,4-epoxycyclohexanecarboxylate, 2-(3,4-epoxycyclohexyl)-1,3-dioxolane, bis(3,4-epoxycyclohexylmethyl) adipate, p-butyl phenyl glycidyl ether, butyl glycidyl ether, cresyl glycidyl ether, allyl glycidyl ether, phenyl glycidyl ether, diglycidyl ether, butanediol diglycidyl ether, limonene dioxide, diethylene glycol diglycidyl ether, 3-methyloxetane, 2-methyloxetane, 3-oxetanol, 2-methyleneoxetane, 3-methyl-3-hydroxymethyloxetane, 3-ethyl-3-hydroxymethyloxetane, 3,3-oxetanedimethanethiol, 2-ethylhexyloxetane, 4-(3-methyloxetan-3-yl)benzonitrile, N-(2,2-dimethylpropyl)-3-methyl-3-oxetanemethanamine, N-(1,2-dimethylbutyl)-3-methyl-3-oxetanemethanamine, xylene bis oxetane, 3-ethyl-3 [{(3-ethyloxetan-3-yl)methoxy}methyl]oxetane, (3-ethyloxetan-3-yl)methyl methacrylate, 4-[(3-ethyloxetan-3-yl) methoxy]butan-1-ol, and mixtures thereof.

14. The hard coating film of claim 11, wherein the reactive monomer is comprised in an amount of 5 parts by weight to 30 parts by weight, based on 100 parts by weight of the epoxy polysiloxane.

15. The hard coating film of claim 1, wherein at least one of the first and second resin compositions further comprises one or more additives selected from the group consisting of an acrylate-based compound, an initiator, a fluorine-based compound, an antioxidant, a surfactant, a yellowing inhibitor, an inorganic filler, a lubricant, a coating aid, and an antifouling agent.

16. The hard coating film of claim 1, wherein the support substrate layer comprises one or more resins selected from the group consisting of polyester-based resins, cellulose-based resins, polycarbonate-based resins, acrylic-based resins, styrene-based resins, polyolefin-based resins, polyimide-based resins, polyether sulfone-based resins, and sulfone-based resins.

17. A display device comprising the hard coating film of claim 1.

* * * * *